(12) United States Patent
Blakeman

(10) Patent No.: US 9,956,680 B2
(45) Date of Patent: May 1, 2018

(54) OVER-MOLDED COMPONENT ASSEMBLY AND METHOD OF FORMING THE SAME

(71) Applicant: APQ Development, LLC, Jackson, MI (US)

(72) Inventor: Rex Blakeman, Jackson, MI (US)

(73) Assignee: APQ Development, LLC, Jackson, MI (US)

( * ) Notice: Subject to any disclaimer, the term of this patent is extended or adjusted under 35 U.S.C. 154(b) by 0 days. days.

(21) Appl. No.: 15/386,861

(22) Filed: Dec. 21, 2016

(65) Prior Publication Data

US 2017/0100833 A1 Apr. 13, 2017

Related U.S. Application Data

(62) Division of application No. 13/827,883, filed on Mar. 14, 2013, now Pat. No. 9,555,538.

(60) Provisional application No. 61/618,487, filed on Mar. 30, 2012.

(51) Int. Cl.
| | |
|---|---|
| *F16B 2/00* | (2006.01) |
| *B25G 3/12* | (2006.01) |
| *B25G 1/00* | (2006.01) |
| *B29C 45/14* | (2006.01) |
| *B29C 45/00* | (2006.01) |
| B29L 31/46 | (2006.01) |
| B29L 31/04 | (2006.01) |
| B29K 23/00 | (2006.01) |
| B29K 509/08 | (2006.01) |
| B29K 105/16 | (2006.01) |
| B29K 705/12 | (2006.01) |

(52) U.S. Cl.
CPC .............. *B25G 3/12* (2013.01); *B25G 1/00* (2013.01); *B29C 45/0001* (2013.01); *B29C 45/14336* (2013.01); *B29C 2045/1495* (2013.01); *B29K 2023/12* (2013.01); *B29K 2105/16* (2013.01); *B29K 2509/08* (2013.01); *B29K 2705/12* (2013.01); *B29L 2031/04* (2013.01); *B29L 2031/463* (2013.01)

(58) Field of Classification Search
CPC .......... B29D 33/00; B32B 1/04; B25G 1/046; B29L 2031/04; B29L 2031/463; F16C 33/385; F16C 33/3856; B29C 45/14065; B29C 2045/14131; B29C 2045/14139; Y10T 74/19772; F16B 7/042; F16B 21/165
See application file for complete search history.

(56) References Cited

U.S. PATENT DOCUMENTS

| | | |
|---|---|---|
| 848,776 A | 4/1907 | Sisson |
| 3,788,148 A | 1/1974 | Connell et al. |
| 4,225,113 A | 9/1980 | Barthelemy et al. |
| 4,750,378 A | 6/1988 | Sheppard |
| 4,867,003 A | 9/1989 | Beauch et al. |
| 5,150,842 A | 9/1992 | Hickey |
| 5,345,679 A | 9/1994 | Lennon et al. |
| 6,225,953 B1 | 5/2001 | Kamei et al. |
| 6,851,722 B2 | 2/2005 | Chiu et al. |
| 6,858,171 B1 | 2/2005 | Wu |

(Continued)

*Primary Examiner* — Michael P Ferguson
*Assistant Examiner* — Matthew R McMahon
(74) *Attorney, Agent, or Firm* — Honigman Miller Schwartz and Cohn LLP

(57) ABSTRACT

A component part has an over-molded integrally formed insert member. The insert member has a predetermined feature. In addition, an end portion of the predetermined feature is exposed and free from over-molding.

15 Claims, 12 Drawing Sheets

(56) References Cited

U.S. PATENT DOCUMENTS

| | | |
|---|---|---|
| 7,210,369 B2 | 5/2007 | Hartig et al. |
| 7,523,681 B2 | 4/2009 | Pan et al. |
| 8,132,479 B2 | 3/2012 | Niwa et al. |
| 9,062,748 B1 | 6/2015 | Guglietti et al. |
| 2009/0084212 A1 | 4/2009 | Niwa et al. |
| 2009/0151493 A1 | 6/2009 | Miyahara |

Prior Art

US 9,956,680 B2

OVER-MOLDED COMPONENT ASSEMBLY AND METHOD OF FORMING THE SAME

CROSS REFERENCE TO RELATED APPLICATIONS

This U.S. patent application is a divisional of, and claims priority under 35 U.S.C. § 121 from, U.S. patent application Ser. No. 13/827,883, filed on Mar. 14, 2013, which claims priority under 35 U.S.C. § 119(e) to U.S. Provisional Application 61/618,487, filed on Mar. 30, 2012. The disclosures of these prior applications are considered part of the disclosure of this application and are hereby incorporated by reference in their entireties.

TECHNICAL FIELD

This disclosure relates to a method and apparatus related to injection molding, and in particular to a method for over-molding an insert member having a feature while forming a component part.

BACKGROUND

Products fabricated through an injection molding process are well known in the art. Further, depending upon the product and intended use of the product, a secondary operation may be required to create an additional feature in the product. The execution of this secondary operation may be required in instances where tooling with a collapsible core or another molding process within an injection molding environment cannot create a feature (e.g., an undercut hole for a bearing) because of a draw angle or a high degree of complexity related to creating the feature. As an example, a complex feature would include an undercut portion included within an aperture.

Presently, a secondary operation such as a machining operation may be used to create such a complex feature after a component part has been molded. However, this machining operation is generally disfavored as it involves high costs per individual product. Furthermore, such secondary operations traditionally require additional processing time, labor, fixtures, and tooling to create the necessary features of the component part.

Referring to FIGS. 1 and 2, an example of a molded component 10 created through multiple operations, including a molding process and secondary machining operations, is shown. FIG. 2 is a cross sectional view of section AA from FIG. 1. The molded component 10 of this example is a handle having a generally cylindrical shape formed through injection molding. The molded component 10 includes a non-injection mold formable feature 18, such as an aperture 20. Further, another non-injection mold formable feature 18 may include an undercut portion 22 which is formed above the aperture 20. Such non-injection mold formable features 18 are introduced through a secondary machining operation.

These complex features, as well as other features that cannot be reliably tooled in a cost effective manner during an injection molding process are introduced through a secondary machining operation.

SUMMARY

One aspect of the disclosure provides a component part including an over-molded integrally formed insert member. The insert member has a predetermined feature which has an end portion exposed and free from over-molding. The over-molding may include use of a glass filled polypropylene.

Implementations of the disclosure may include one or more of the following features. In some implementations, the predetermined feature defines an undercut portion surrounding an edge of an aperture defined by the insert member. The undercut portion may define a bearing surface that receives a bearing element. Additionally or alternatively, the undercut portion may be configured to receive and retain a rolling component.

In some examples, the insert member includes a bearing assembly integrally formed with the component part. A portion of the bearing assembly may be free of any over-molding. The insert member may include a first insert portion joined to an end portion of a second insert portion. The first insert portion and the second insert portion may be steel or plastic. Additionally or alternatively, the first insert portion may be a cylindrically shaped body defining a centrally located aperture.

Another aspect of the disclosure provides a method of forming a component part by injection molding. The method includes forming an insert member. The insert member has a predetermined feature. The method further includes placing the insert member in a mold cavity, and injecting a material into the mold cavity to form an over-molded portion. The over-molded portion covers an outer surface of the insert member and excludes an end portion of the predetermined feature to form the component part.

In some implementations, forming the insert member includes forming the predetermined feature to define an undercut portion surrounding an edge of an aperture defined by the insert member. The method may further include forming the undercut portion to define a bearing surface for receiving a bearing element. Additionally or alternatively, the method may include forming the undercut portion to receive and retain a rolling component.

The insert member may include a bearing assembly. In some examples, forming the insert member includes joining a first insert portion to an end portion of a second insert portion. The first insert portion and the second insert portion may be steel or plastic. Additionally or alternatively, the first insert portion may be formed as a cylindrically shaped body defining a centrally located aperture.

Yet another aspect of the invention provides a quick connect handle. The quick connect handle includes a handle, a bearing assembly insert, and a cylindrical sleeve. The bearing assembly insert is molded onto a tip portion of the handle. The cylindrical sleeve defines a raceway and releasably engages with the tip portion of the handle. The tip portion of the handle detachably interfaces with the cylindrical sleeve for securing the handle to an object. The tip portion of the handle may provide a snap-fit engagement with the cylindrical sleeve. In some examples, the bearing assembly is integrally formed with the handle.

In some implementations, the bearing assembly includes a first insert portion joined to an end portion of a second insert portion. The first insert portion may include a cylindrically shaped body defining a centrally located aperture.

An undercut portion may surround an edge of an aperture defined by the bearing assembly. In some examples, the undercut portion defines a bearing surface that receives a bearing element. Additionally or alternatively the undercut portion may be configured to receive and retain a rolling component.

One aspect of the disclosure provides a method for molding a component part with an integral complex feature. The method includes the step of forming an insert member that includes a predetermined feature. The method also includes the step of selectively positioning the insert member in a mold. The method further includes the step of injecting molding material into the mold around the insert member and applying heat and pressure to form the component part with the integrally formed feature.

Another aspect of the disclosure provides an insert member that is a bearing assembly which includes a first insert member which is molded separate from a second insert member, and the first member and the second member are joined together. Further, the first insert member and the second insert member may be assembled to thereby provide a snap fit between these members.

Yet another aspect of the disclosure provides a handle having an integrally formed over-molded portion, and the handle further includes an insert member having the predetermined feature therein, and an end portion of the predetermined feature is not over-molded. The handle also includes a rolling element which is positioned within the insert member.

Advantageously, the present disclosure provides a component having an integrally molded feature and a method for injection molding a component having an integrally molded feature is provided. Another advantage is that the predetermined feature is formed in an insert member and the insert member is molded in place to form the component part, which may be part of an assembly. The method for molding provides flexibility in the design of the component part to integrally mold a predetermined feature within the component part. Another advantage arises from the capability of the component part to form a snap fit joint that is simple to manufacture and characterized by acceptable strength. Moreover, the component part is able to withstand the cavity pressure of the mold and thereby allows for one or more features to be formed at the same time. Avoiding the use of secondary machining operations, holding fixtures, and other costs associated with a secondary operation provides significant cost savings. A bearing feature can be included in an insert member that is over-molded into a component part.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 10:
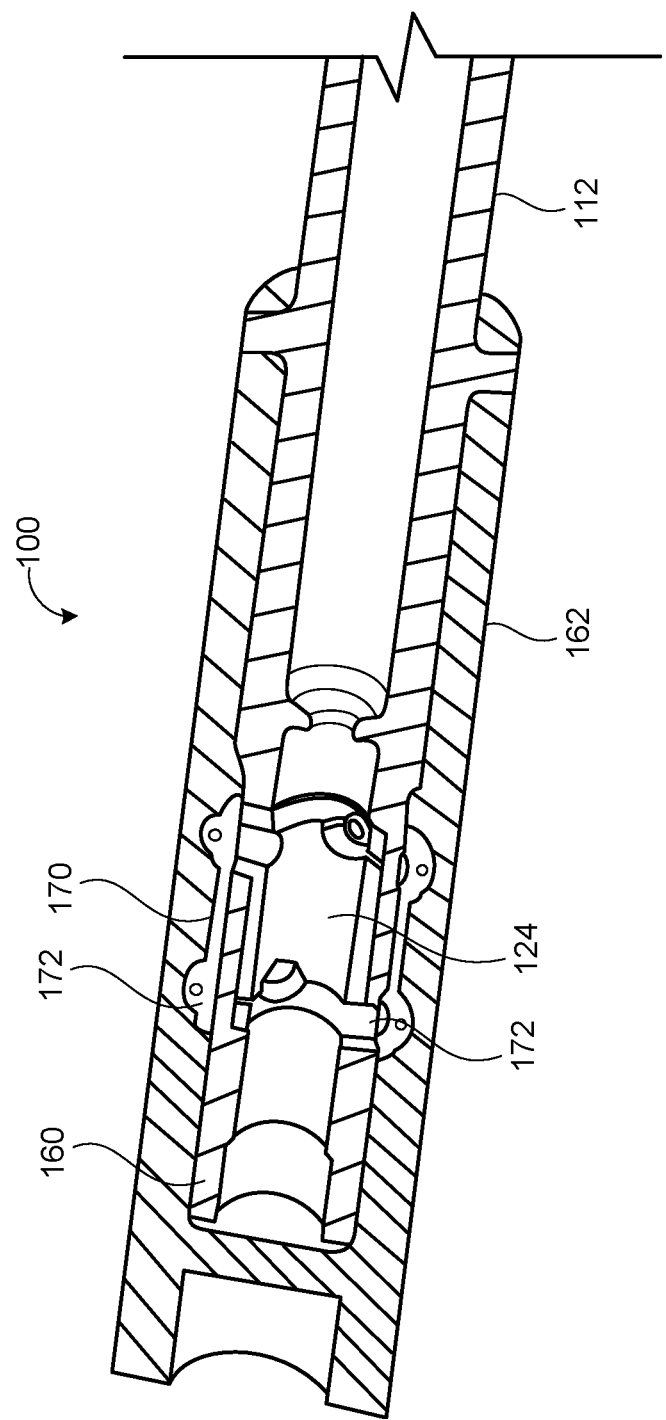
FIG. 10 is a cross-sectional view of a handle engaged within the sleeve.

Referring to FIGS. 3-7, in some implementations, a molded component part 100 is a handle 112 engaged by a sleeve 162 (FIG. 10). The handle 112 includes a locking tip portion 160, having an integrally formed feature that provides for snap-fit engagement with the sleeve 162. Although the component part 100 is a handle 112, it is contemplated that other types of component parts 100 could similarly have an integrally formed feature. The molded handle 112 includes a base 114 which has a generally cylindrical shape, a locking tip portion 160 also having a cylindrical shape, and a longitudinally formed interior channel 116 extending through the entire handle 112.

The locking tip portion 162 of the handle 112 also includes a predetermined feature 118. Various examples of features 118 are contemplated, and the type of feature is non-limiting. In some examples, the feature 118 is an aperture 120. Another example of a feature 118 is an undercut portion 122 which surrounds the edge of the aperture 120. In the example of a snap-fit handle, the undercut portion 122 receives a bearing or rolling element (not illustrated) and accordingly forms a bearing surface. Further, the undercut portion 122 assists in retaining rolling elements in the undercut 122 of bearing surface of this example.

Referring to FIGS. 4-7, in some implementations, an insert member 124 has a predetermined feature 118 (e.g., an aperture or an undercut). This separately formed insert member 124 is integrally over-molded within the molded component part 100. An example of an insert member 124 having a predetermined feature 118 is a bearing assembly 126 for the handle 112 of this example, which allows for snap-fit engagement with a second object i.e. sleeve 162 (FIG. 10). The bearing assembly 126 is integrally formed in the handle 112 by inserting the separately formed bearing assembly 126 in the mold used to mold the handle 112, and over-molding around the bearing assembly 126 while molding the handle 112. It should be appreciated that a portion of the bearing assembly 126 may not be over-molded, such as an end feature in this example. The bearing assembly 126 includes an interior cavity 132 that is contiguous with the handle interior channel 116.

The bearing assembly 126 may be formed using a variety of techniques, depending on the type of feature and characteristics of the predetermined feature 118. In this example, the bearing assembly 126 is formed using an injection molding process. Various types of materials may be utilized, such as a glass filled poly propylene material, a plastic material, steel, or another material, and the selection is non-limiting. In this example, the material is selectively determined to create a bond with the handle 112 material to thereby form a singular over-molded component part, withstand a cavity pressure of at least 10,000 psi during an over-mold process. In some examples, the handle 112 is of a glass filled poly propylene material, a plastic material, or the like.

Figure 1:
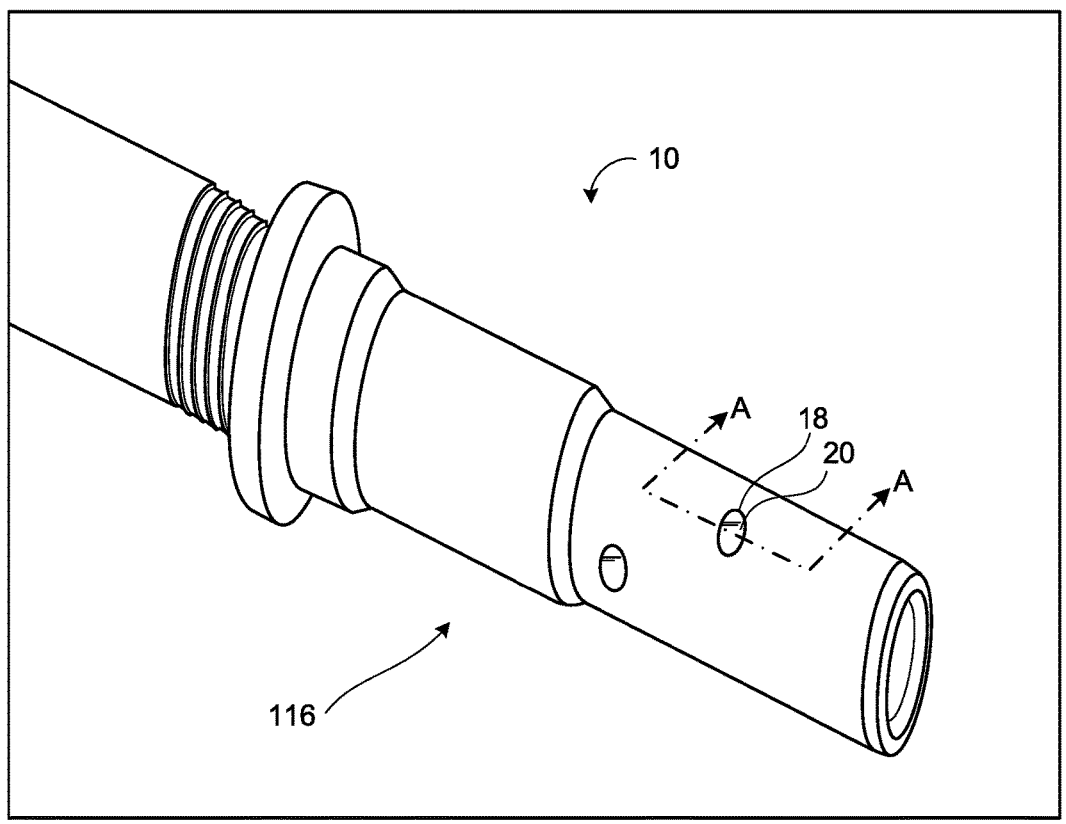
FIG. 1 is a perspective view of a prior art design of a molded handle.
Figure 2:
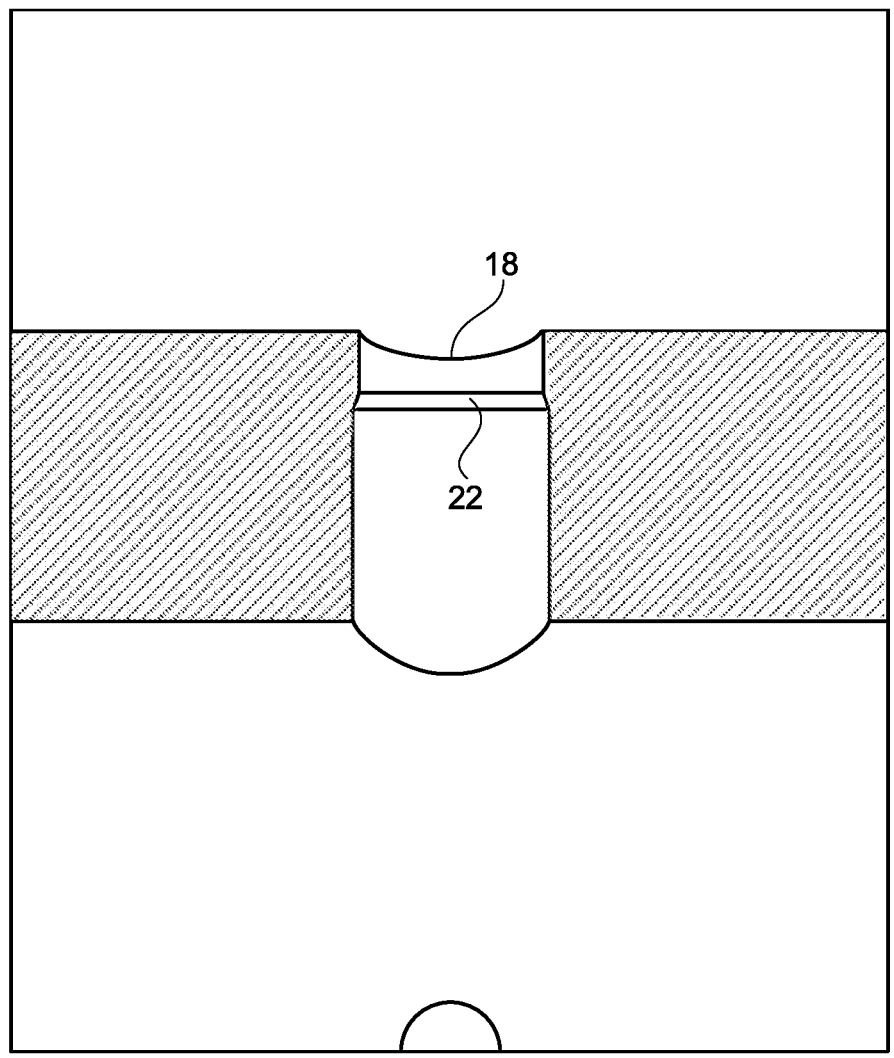
FIG. 2 is a side view of the molded handle of FIG. 1.
Figure 3:
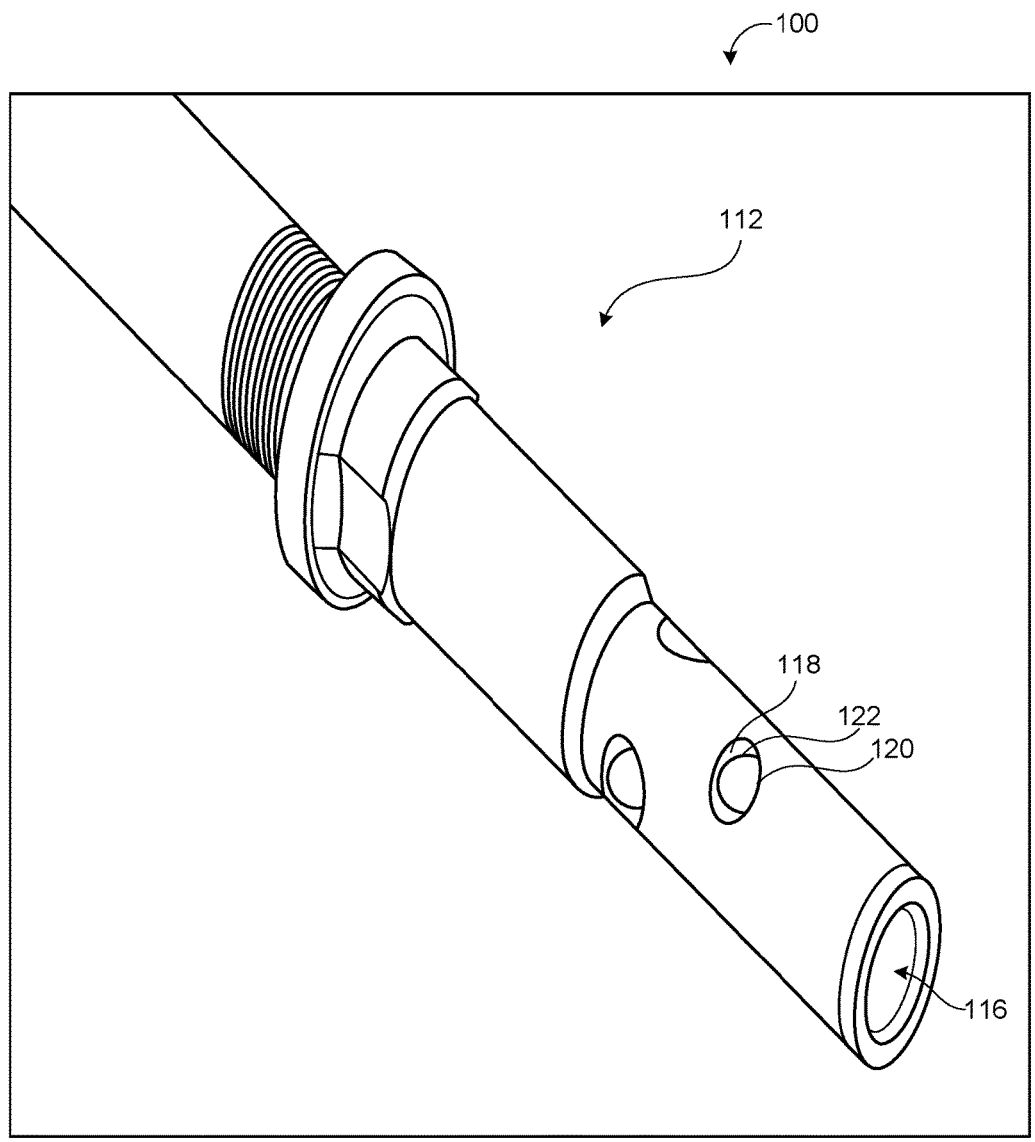
FIG. 3 is a perspective view of a component including an over-molded portion.
Figure 4:
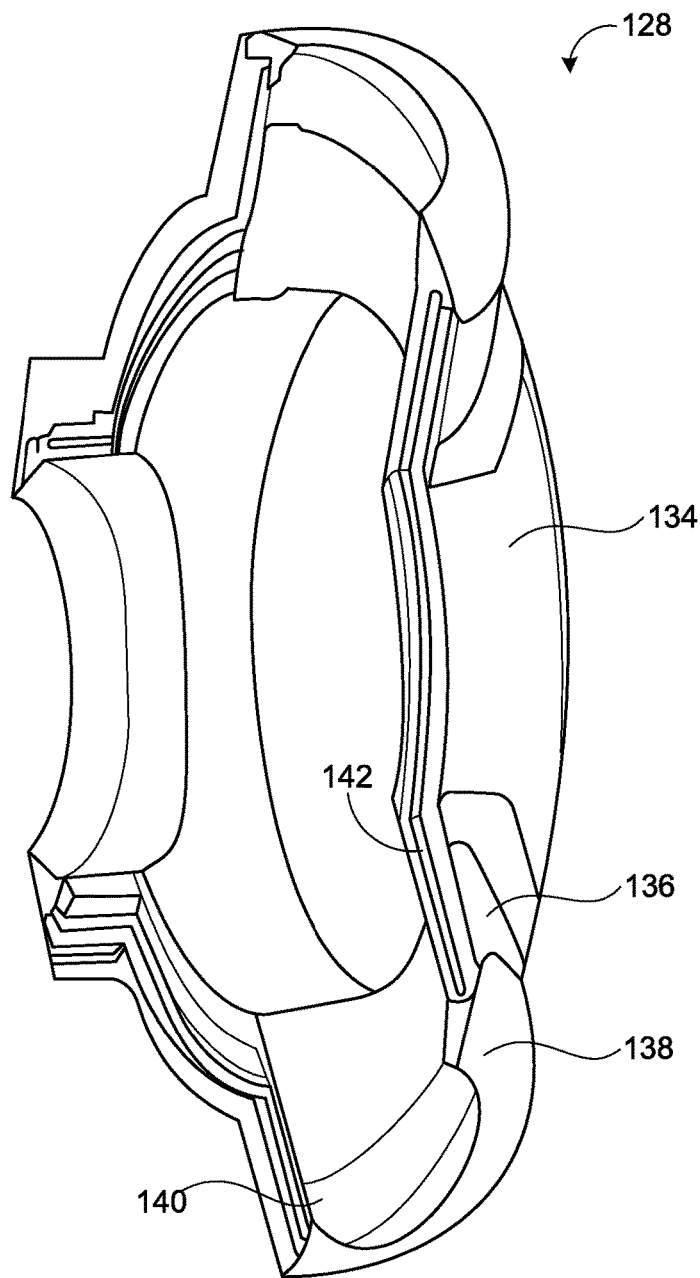
FIG. 4 is a perspective view of a first insert portion.
Figure 5:
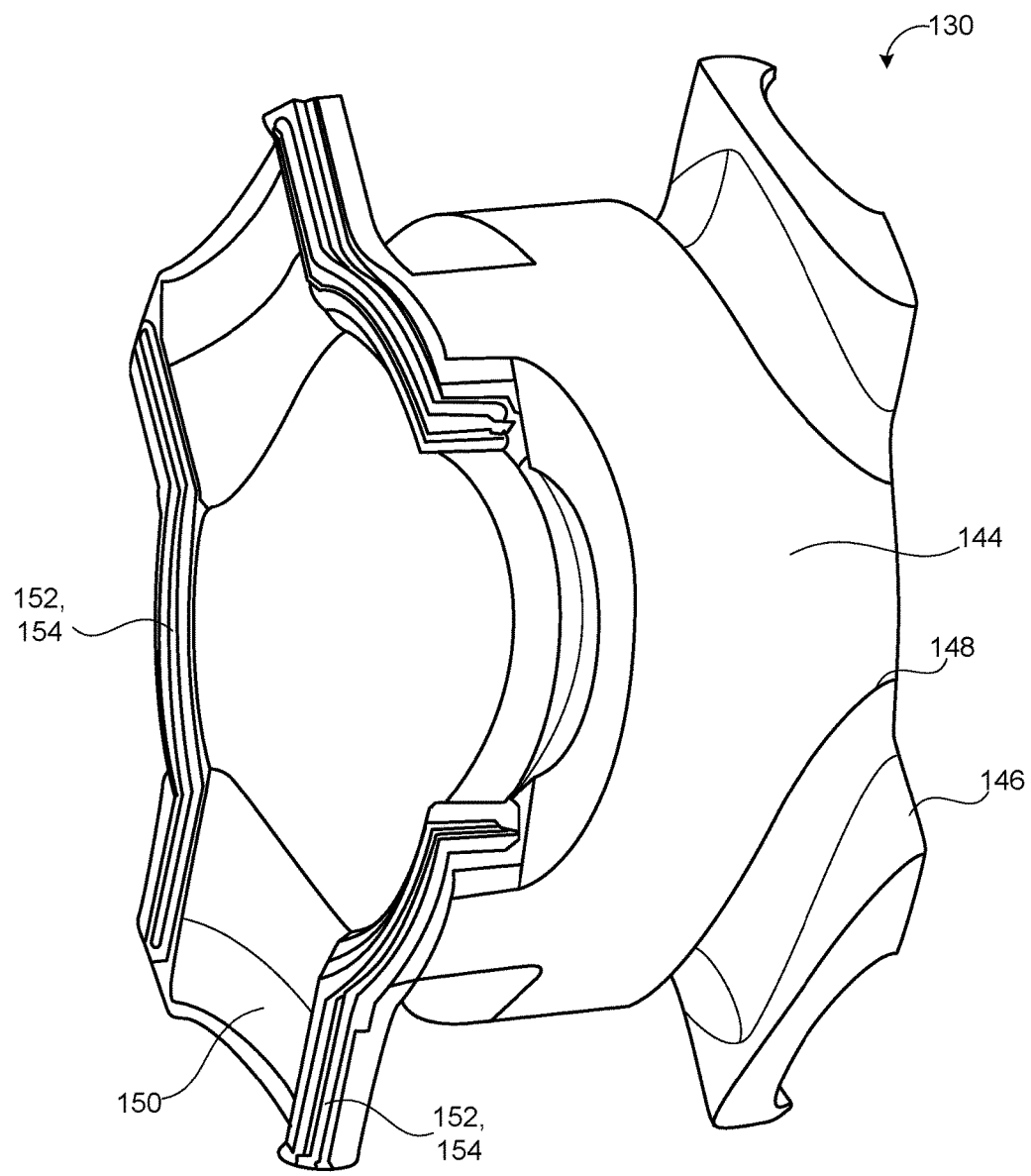
FIG. 5 is a perspective view of a second insert portion.
Figure 6:
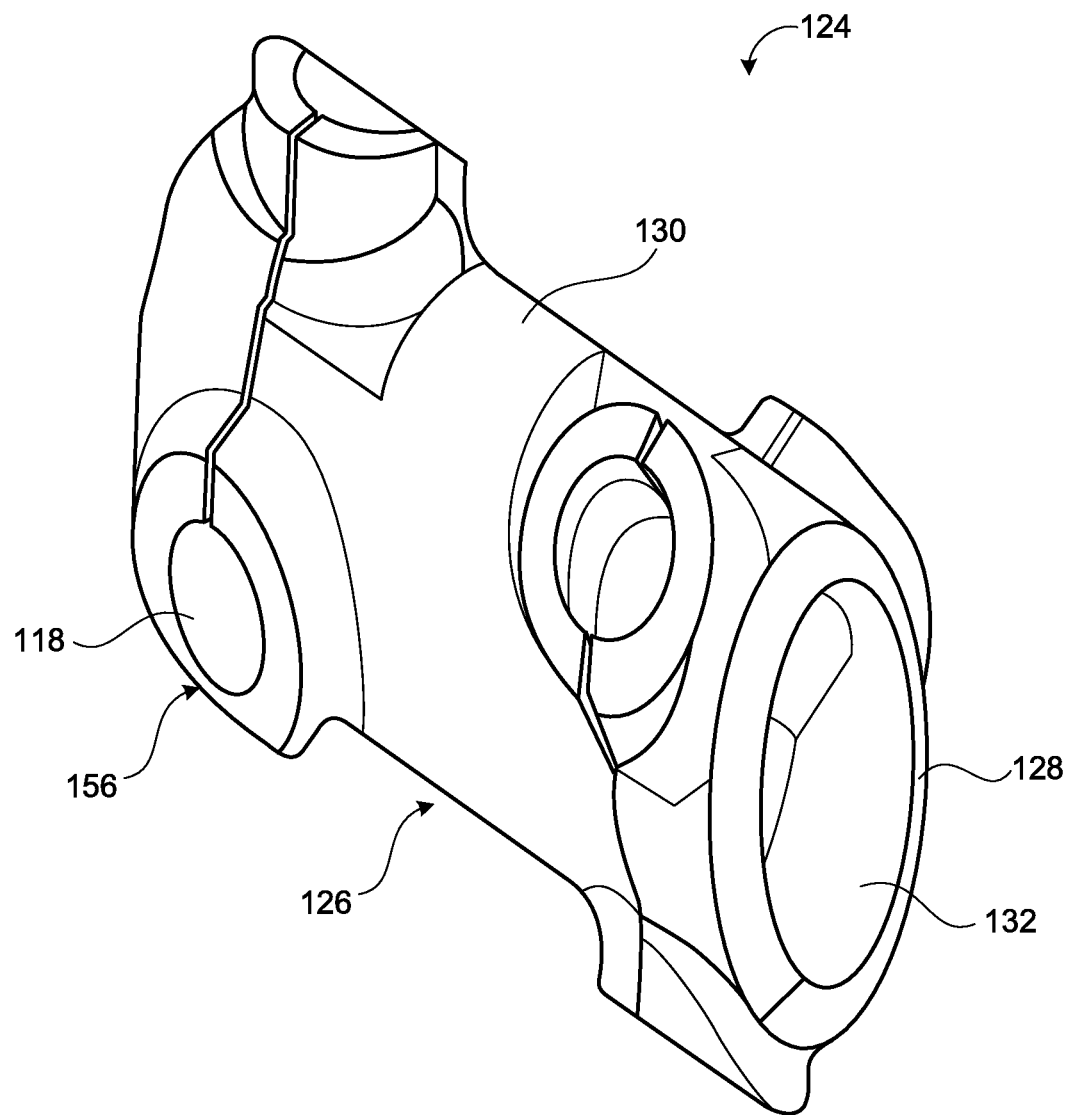
FIG. 6 is a perspective view of a bearing assembly including the first member and second member of FIGS. 4 and 5.

The bearing assembly 126 may include a first insert portion 128 joined to a second insert portion 130 as illustrated in FIG. 6. The first insert portion 128 is coupled to an end portion of the second insert portion 130. While in this example the bearing assembly 126 is formed from three separate members joined together, other combinations are possible. As shown, the first insert portion 128 is connected to each longitudinal end portion of the second insert portion 130. In some examples, the first insert portion 128 and the second insert portion 130 may be integrally formed as one piece.

The first insert portion 128 and the second insert portion 130 may be formed separate from one another through a molding process. The first insert portion 128 and the second insert portion 130 may be joined using a suitable joining technique, such as bonding, welding, sonic welding, or the like to provide an integral member. The molding process may be executed once to form the first insert portion 128 and the second insert portion 130 concurrently, or may be executed multiple times to form the first insert portion 128 and the second insert portion 130 at different times. Further, the first insert portion 128 and the second insert portion 130 may be fabricated of a steel material, a plastic material, or any other material which will withstand a cavity pressure of at least 10,000 psi during an over-mold process.

Referring back to FIG. 4, the first insert portion 128 includes a cylindrically-shaped first insert portion body portion 134 with a centrally located aperture defined therein. A first insert portion flange 136 extends radially from an edge 138 of the first insert portion body portion 134. As shown, the first insert portion flange 136 is formed integral with the first insert portion body portion 134. However, it should be appreciated that in another example, the first insert portion flange 136 may be formed separate from the first insert portion body portion 134. The first insert portion flange 136, as shown, is curvilinear in shape, and forms a bearing surface. The first member may include a plurality a flanges 136.

The first insert portion flange 136 further includes an undercut portion 140 formed in an inner surface of an outer edge 138 of the flange 136. The flange 136 may also include an upstanding engagement portion or wall 142 formed along an upper edge of the flange 136 and extending circumferentially therealong for engaging the first insert portion 128 to the second insert portion 130. However, it should be appreciated that the first insert portion 128 may include a plurality of engagement portions 142. In some examples, a rib or another locking member may be used to interconnect the first insert portion 128 and another member such as the second insert portion 130 which will provide a "snap fit", locking functionality, or the like.

Referring back to FIG. 5, the second insert portion 130 includes a cylindrically-shaped second insert portion body portion 144 which includes a longitudinally extending interior cavity that forms parts of the interior cavity 132. A second insert portion flange 146 extends radially from an edge 148 of the second insert portion body portion 144. The second insert portion flange 146 is formed integral with the second member body portion 144. However, it should be appreciated that in another example, the second insert portion flange 146 may be formed separate from the second insert portion body portion 144. The second insert portion 130 may include a plurality of flanges 146 spaced a predetermined distance apart. The flange 146 may be curvilinear in shape, and forms a portion of a bearing surface.

The second insert portion 130 may further include an engagement portion 152, formed along an outermost edge of the second flange 146 and extending circumferentially therealong for engaging the first insert portion 128 to the second insert portion 130. The engagement portion 152 such as a rib 154 may be formed along an edge of the second insert portion flange 146 and extend circumferentially therealong the edge for engagement with the engagement portion 142 of the first insert portion 128. It should be appreciated that the rib 154 may include a plurality of ribs. Other types of engagement features may be utilized, such as a recess or another locking member which will provide a "snap fit" or locking functionality.

Referring to FIG. 6, the coupling between the first insert portion 128 and the second insert portion 130 are shown. The foregoing coupling may be established between the first insert portion flange 136 and the second insert portion flange 146 via a securable engagement of the rib 154 with the recessed engagement wall 142. A securable coupling between the first insert portion 128 and the second insert portion 130 may be established using a suitable technique, such as welding, sonic welding, gluing, hot plating, heat staking, or the like.

The insert member 124 may form a predetermined feature 118, as shown at 156, which includes the first insert portion undercut portion 140 and the second insert portion undercut portion 150. The combined first insert and second insert undercut portions 156 form a predetermined angle with respect to an outer edge of the combined insert members. A bearing (not illustrated) is situated within the raceway formed by the combined undercut portion 156. The bearing is inserted into the interior cavity 132 formed within the bearing assembly 126 and is restricted from disengaging or rolling out of the bearing assembly 126 because of the combined undercut portion 156. A portion of the bearing may movably extend beyond the combined undercut portion 156 of the bearing assembly 126, or may movably retract into the bearing assembly 126. The combined undercut portion 156 forms a predetermined angle with respect to an outer edge of the bearing assembly 126. In some examples, the combined undercut portion 156 may be at two levels on 120 degree centers. However, the component part 100 may be designed to include additional feature(s) beyond the previously described features.

Figure 7:
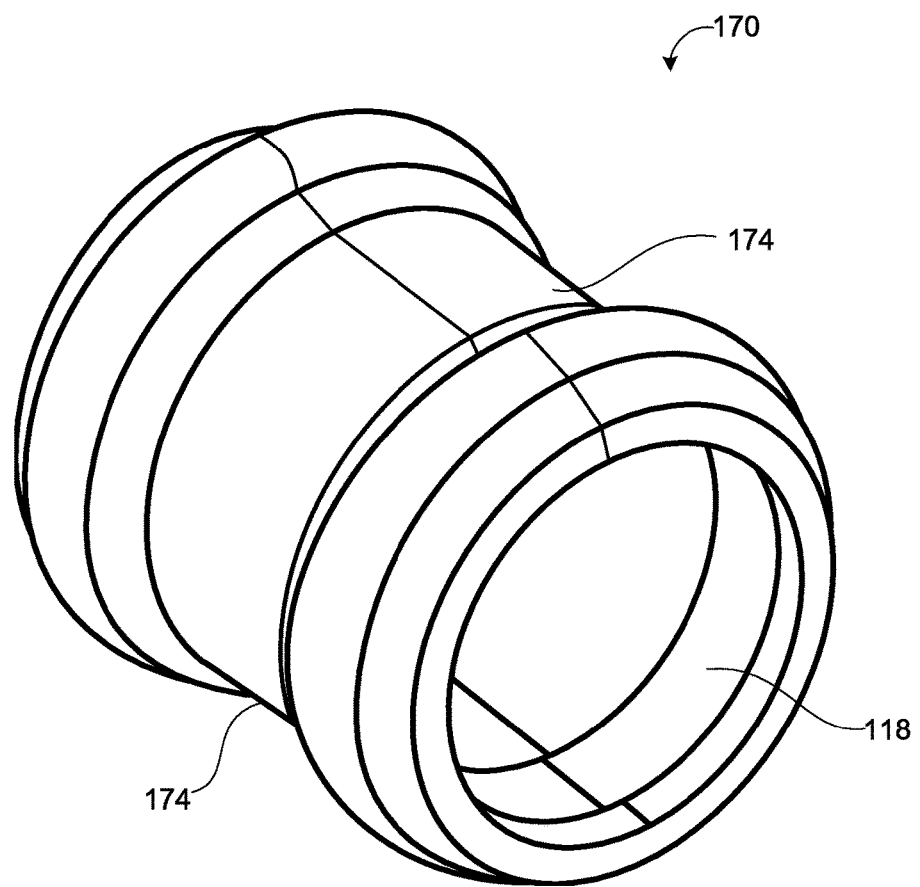
FIG. 7 is a perspective view of another example of a two-part bearing assembly.

Referring to FIG. 7, in some implementations, a two part bearing guide assembly 170 is shown. The bearing guide assembly 170 of this example is formed using identical members, i.e., a first half member 174 and a second half member 174 which may be joined together, such as by sonic weld welding or the like.

Referring back to FIG. 3 and FIGS. 8-10, the snap-fit engagement of the handle 112 with a sleeve 162 is shown. The handle 112 includes a locking tip portion 160. The bearing assembly 126 is integrally fanned in the locking tip portion 160 to provide a quick connect functionality for releasably engaging another object (not shown). In this example the object is a sleeve 162 connected to another object such as shovel attachment, a garden rake attachment, or the like to provide a quick connect. It should be appreciated that a variety of attachment members may be utilized as the aforementioned listing is non-limiting.

Figure 8:
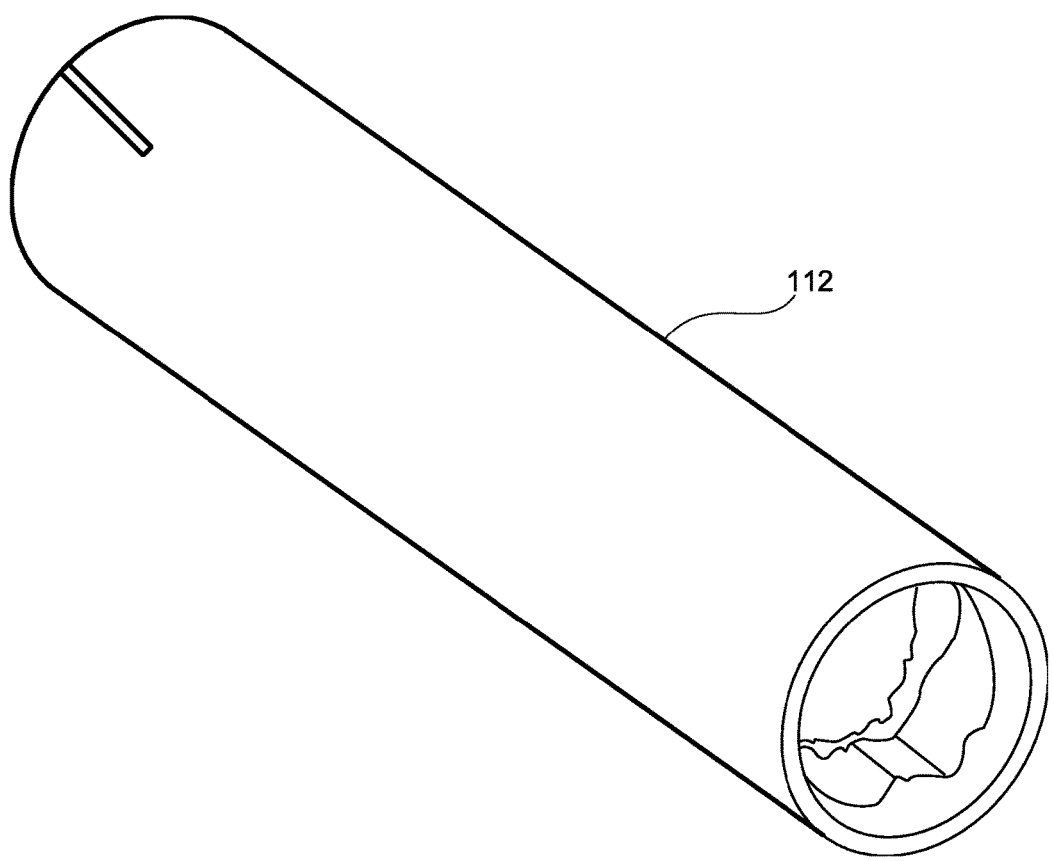
FIG. 8 is a perspective of a sleeve having the two-part assembly of FIG. 7.
Figure 9:
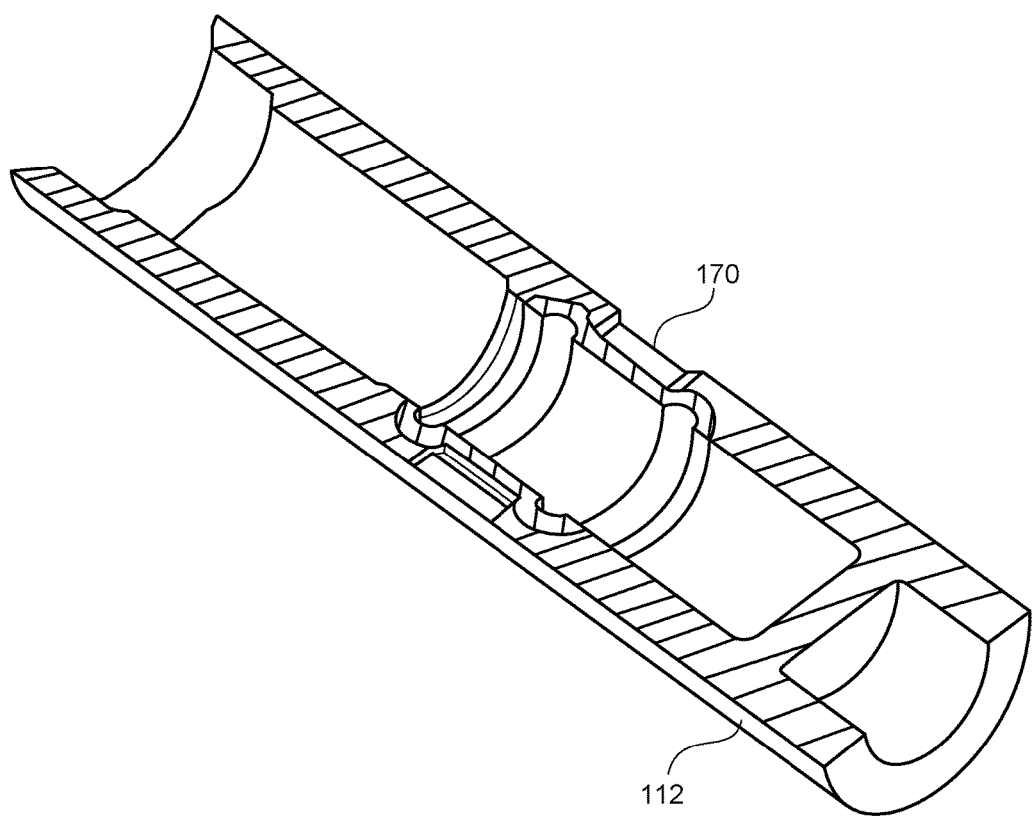
FIG. 9 is a cross-sectional view of the sleeve of FIG. 8.

As shown in FIGS. 8 and 9, in some implementations, the sleeve 162 is a cylindrical member, and may likewise include a feature 118. The sleeve 162 includes a channel formed in the wall of the sleeve 162 to serve as a runway 172 for the bearings. The locking tip portion 160 of the handle 112 detachably interfaces with the sleeve 162 to secure the handle 112 to another object quickly and in a positive manner, while providing for a quick disconnect. The bearings which are situated within the bearing assembly 126 may interface with runways 172 included with the sleeve 162.

Figure 11:
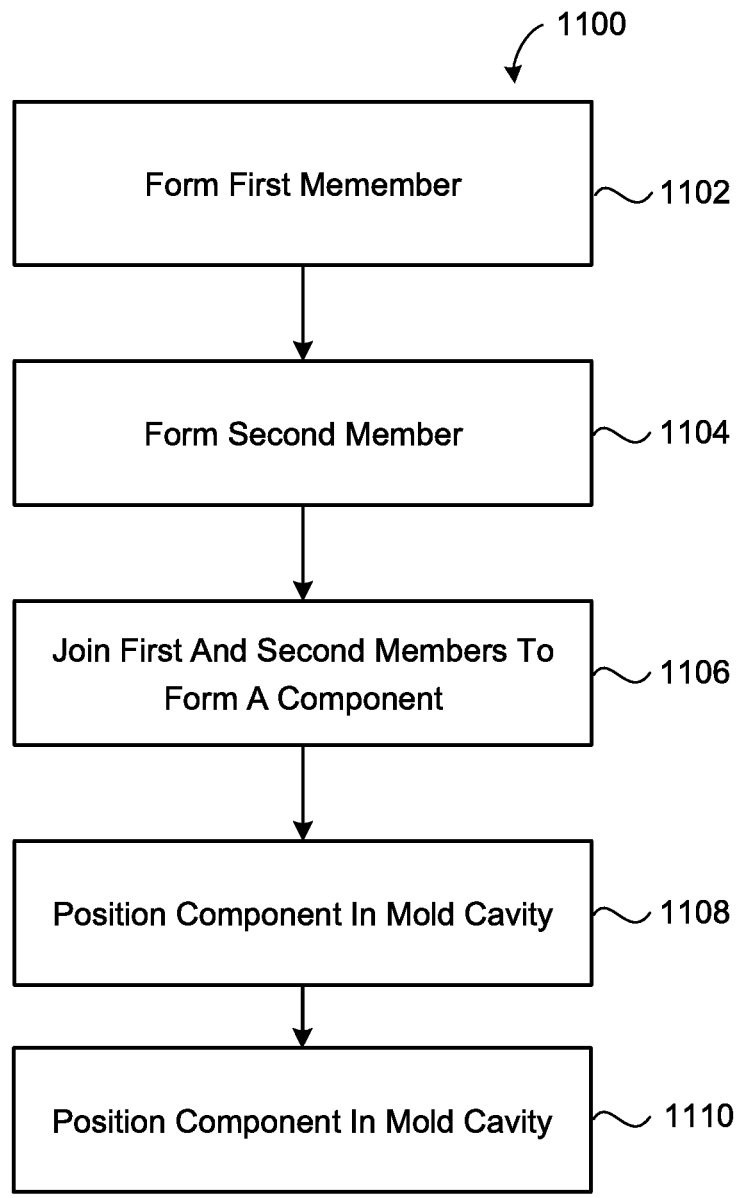
FIG. 11 is a block diagram of an exemplary method of molding a component by over-molding an insert member in the mold.

FIG. 11 provides an exemplary method 1100 of forming a component part 100 having an insert member 124 overmolded therein by injection molding. The method 1100 includes forming 1100 a first insert portion 128. The first insert portion 128 is molded as previously described. The first insert portion 128 includes a feature 118 that will be incorporated in the finished product.

The method also includes forming 1102 a second insert portion 30 as previously described. The second insert portion 130 may likewise contain a predetermined feature 118 that will be incorporated in the finished product.

The method additionally includes joining 1104 together the first insert portion 128 and second insert portion 130 to form an insert member 124 using a joining technique, such as via sonic welding. The insert member 124 may be a bearing assembly 126.

The method may include selectively positioning 1106 the insert member 124 in a mold cavity, and forming the component part 100, which in this example is the handle 112, by injection molding 1108 a predetermined material into the mold. The injected material flows throughout the mold and covers at least a portion of an outer surface of the insert member 124. In this example, an end portion of the insert member 124 is not over-molded. Thereafter, the heat or pressure may be applied as part of the molding process to cure the material.

The predetermined material used to form the over-molded portion of the component part may include a glass filled polypropylene or any other suitable material. Accordingly, a portion or an entirety of the handle 112 is over-molded to form a single integral member having one or more predetermined features 118. In this example the one or more predetermined features establish the structural characteristics of the handle. Advantageously, the over molding process eliminates the need for a secondary process, such as machining, during the formation of the desired component.

Figure 12:
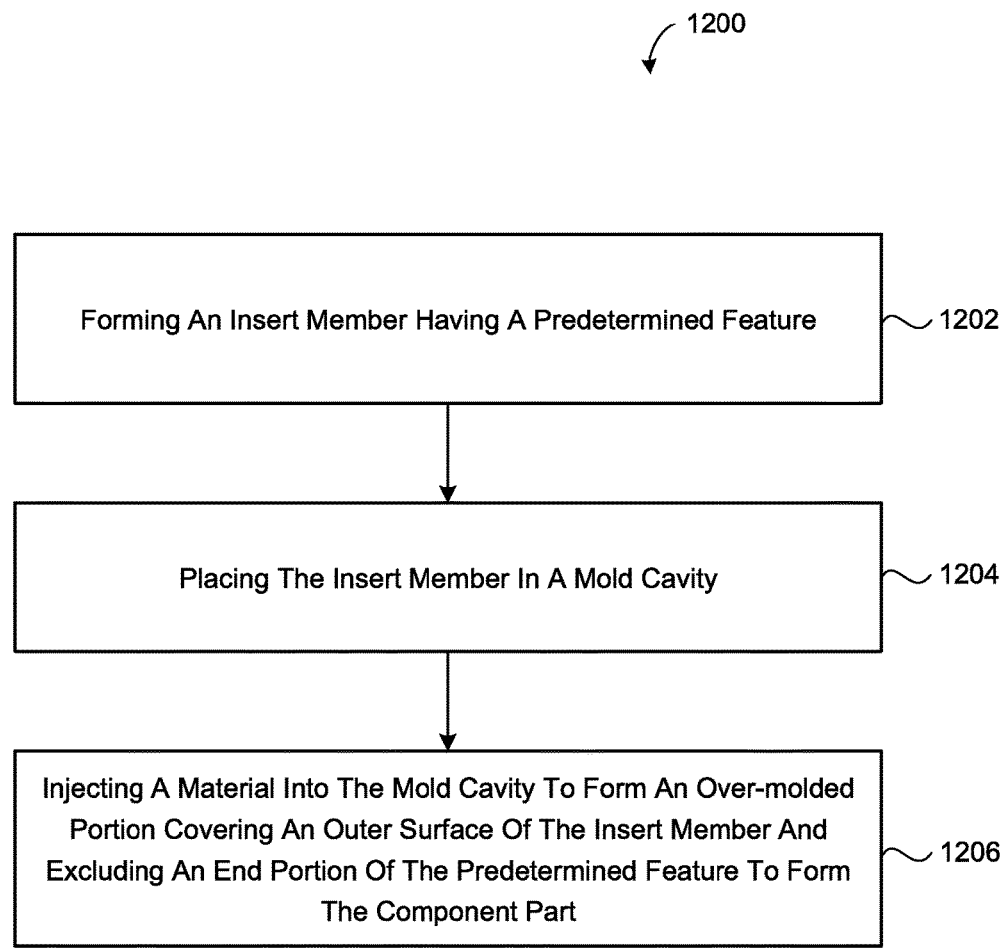
FIG. 12 is a block diagram of an exemplary method of molding a component by injection molding.

FIG. 12 provides an exemplary method 1200 of forming a component part 100 by injection molding. The method 1200 includes forming an insert member 124 having a predetermined feature 118. The method further includes placing 1204 the insert member 124 in a mold cavity, and injecting 1206 a material into the mold cavity to form an over-molded portion. The over-molded portion covers an outer surface of the insert member 124 and excludes an end portion of the predetermined feature 118 to form the component part 100.

In some implementations, forming the insert member 124 includes forming the predetermined feature 118 to define an undercut portion 122 surrounding an edge of an aperture 120 defined by the insert member 124. The method 1200 may further include forming the undercut portion 122 to define a bearing surface for receiving a bearing element. Additionally or alternatively, the method 1200 may include forming the undercut portion 122 to receive and retain a rolling component.

The insert member 124 may include a bearing assembly 126. The insert member 124 may form a predetermined feature 118, as shown at 156, including a first insert portion 140 and a second insert portion 150. In some examples, forming the insert member 156 includes joining a first insert portion 140 to an end portion of a second insert portion 150. The first insert portion and the second insert portion (140, 150) may be steel or plastic. Additionally or alternatively, the first insert portion (140) may be formed as a cylindrically shaped body defining a centrally located aperture.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

What is claimed is:

1. A method of forming a component part by injection molding, the method comprising:
   forming an insert member having a predetermined feature;
   placing the insert member in a mold cavity; and
   injecting a material into the mold cavity to form an over-molded portion covering an outer surface of the insert member and excluding an end portion of the predetermined feature to form the component part,
   wherein the insert member comprises:
      a first insert portion comprising a cylindrically-shaped first insert portion body portion defining a first centrally located aperture and a first insert portion flange extending radially from an edge of the first centrally located aperture defined by the first insert portion body portion, the first insert portion flange defining a first recess with a first undercut portion formed in an inner surface of an outer edge of the first insert portion flange; and
      a second insert portion comprising a cylindrically-shaped second insert portion body portion defining a second centrally located aperture and a second insert portion flange extending radially from an edge of the second centrally located aperture defined by the second insert portion body portion, the second insert portion flange defining a second recess with a second undercut portion formed in an inner surface of an outer edge of the second insert portion flange,
   wherein the first undercut portion and the second undercut portion form the predetermined feature of the insert member when the first insert portion is joined to the second insert portion via a securable coupling between the first insert portion flange and the second insert portion flange,
   wherein the first insert portion body portion and the second insert portion body portion are aligned such that the first centrally located aperture and the second centrally located aperture are coaxial with one another to define a longitudinally extending internal cavity through the insert member when the first insert portion is joined to the second insert portion via the securable coupling, and
   wherein, when the first insert portion is joined to the second insert portion, the predetermined feature is formed to define a combined undercut portion surrounding an edge of a radial aperture defined by the insert member, the radial aperture being formed by the first recess being aligned with the second recess, and the combined undercut portion being formed by the first undercut portion being aligned with the second undercut portion.

2. The method of claim 1, wherein the combined undercut portion defines a bearing surface.

3. The method of claim 1, wherein the combined undercut portion is configured to receive and retain a rolling component.

4. The method of claim 1, wherein the insert member comprises a bearing assembly integrally formed with the component part.

5. The method of claim 4, wherein a portion of the bearing assembly is free of any over-molding.

6. The method of claim 1, wherein the first insert portion and the second insert portion comprise steel or plastic.

7. The method of claim 1, wherein the insert member is integrally over-molded within the component part by injection molding using a glass filled polypropylene.

8. A quick connect handle comprising:
   a handle;
   a bearing assembly insert-molded onto a tip portion of the handle, the bearing assembly having a predetermined feature; and
   a cylindrical sleeve defining a raceway and releasably engaged with the tip portion of the handle,
   wherein the bearing assembly comprises:
      a first insert portion comprising a cylindrically-shaped first insert portion body portion defining a first centrally located aperture and a first insert portion flange extending radially from an edge of the first centrally located aperture defined by the first insert portion body portion, the first insert portion flange defining a first recess with a first undercut portion formed in an inner surface of an outer edge of the first insert portion flange; and
      a second insert portion comprising a cylindrically-shaped second insert portion body portion defining a second centrally located aperture and a second insert portion flange extending radially from an edge of the second centrally located aperture defined by the second insert portion body portion, the second insert portion flange defining a second recess with a second undercut portion formed in an inner surface of an outer edge of the second insert portion flange,
      wherein the first undercut portion and the second undercut portion form the predetermined feature of the bearing assembly when the first insert portion is joined to the second insert portion via a securable coupling between the first insert portion flange and the second insert portion flange,
      wherein the first insert portion body portion and the second insert portion body portion are aligned such that the first centrally located aperture and the second centrally located aperture are coaxial with one another to define a longitudinally extending internal cavity through the bearing assembly when the first insert portion is joined to the second insert portion via the securable coupling, and
      wherein, when the first insert portion is joined to the second insert portion, the predetermined feature is formed to define a combined undercut portion surrounding an edge of a radial aperture defined by the bearing assembly, the radial aperture being formed by the first recess being aligned with the second recess, and the combined undercut portion being formed by the first undercut portion being aligned with the second undercut portion.

9. The handle of claim 8, wherein the bearing assembly insert-molded onto the tip portion of the handle detachably interfaces with the cylindrical sleeve for securing the handle to an object.

10. The handle of claim 8, wherein the bearing assembly insert-molded onto the tip portion of the handle provides a snap-fit engagement with the cylindrical sleeve.

11. The handle of claim 8, wherein the combined undercut portion defines a bearing surface.

12. The handle of claim 8, wherein the combined undercut portion is configured to receive and retain a rolling component.

13. The handle of claim 8, wherein a portion of the bearing assembly is free of any over-molding.

14. The handle of claim 8, wherein the first insert portion and the second insert portion comprise steel or plastic.

15. The handle of claim 8, wherein the bearing assembly is integrally over-molded onto the tip portion of the handle by injection molding using a glass filled polypropylene.

\* \* \* \* \*